(12) United States Patent
France

(10) Patent No.: US 9,002,112 B2
(45) Date of Patent: Apr. 7, 2015

(54) VIDEO ALIGNMENT SYSTEM

(71) Applicant: Peter G France, Christchurch (NZ)

(72) Inventor: Peter G France, Christchurch (NZ)

(73) Assignee: Trimble Navigation Limited, Sunnyvale, CA (US)

( * ) Notice: Subject to any disclaimer, the term of this patent is extended or adjusted under 35 U.S.C. 154(b) by 123 days.

(21) Appl. No.: 14/010,797

(22) Filed: Aug. 27, 2013

(65) Prior Publication Data

US 2015/0063702 A1    Mar. 5, 2015

(51) Int. Cl.
*G06K 9/46* (2006.01)
*G01B 11/14* (2006.01)
*H04N 7/18* (2006.01)

(52) U.S. Cl.
CPC *G06K 9/46* (2013.01); *G01B 11/14* (2013.01); *H04N 7/18* (2013.01)

(58) Field of Classification Search
None
See application file for complete search history.

(56) References Cited

U.S. PATENT DOCUMENTS

| 7,030,969 | B2 | 4/2006 | Giger |
| 8,243,103 | B2 | 8/2012 | Dobbie |
| 8,508,472 | B1 | 8/2013 | Wieder |
| 2001/0022859 | A1 | 9/2001 | Okabayashi |
| 2003/0169233 | A1 | 9/2003 | Hansen |
| 2007/0260145 | A1* | 11/2007 | Heanue et al. ............... 600/473 |
| 2009/0010644 | A1* | 1/2009 | Varshneya et al. ............ 398/33 |
| 2009/0115722 | A1 | 5/2009 | Shan |
| 2010/0194942 | A1* | 8/2010 | Wada ........................... 348/294 |
| 2013/0087684 | A1* | 4/2013 | Guetta et al. ............... 250/208.1 |
| 2013/0336536 | A1* | 12/2013 | Perruchot et al. ............ 382/103 |

FOREIGN PATENT DOCUMENTS

| GB | 2374228 A | 10/2002 |
| GB | 2471839 A | 1/2011 |

OTHER PUBLICATIONS

International Search Report and Written Opinion of the International Searching Authority in PCT/US2014/052306, Oct. 12, 2014.

* cited by examiner

*Primary Examiner* — Bhavesh Mehta
*Assistant Examiner* — David F Dunphy
(74) *Attorney, Agent, or Firm* — NUPAT, LLC; Morrison Ulman

(57) ABSTRACT

A video alignment system is described in which the location of a modulated spot in a video scene is estimated with correlation techniques including tracking multiple camera phase shift candidates and normalizing correlation sums with a voting system.

20 Claims, 8 Drawing Sheets

VIDEO ALIGNMENT SYSTEM

TECHNICAL FIELD

The disclosure is related to video alignment systems and techniques.

BACKGROUND

Handheld geographic information system (GIS) data collection devices are used by utility companies, municipalities, environmental management agencies and others for diverse applications including as-built mapping of power lines, service outage reporting, weed management, water network modeling, etc. An advanced GIS handheld combines a high-accuracy global navigational satellite system (GNSS) receiver, a computer and display, a digital camera, and a cellular data radio in one unit. An operator uses the device to collect position data for utility poles, manhole covers, or myriad other features. Position, images and other data entered by the operator may then be transmitted to a GIS database via the cellular radio data link. As an example of GIS data collection in action, twenty crews of historic preservation surveyors used GIS handhelds to record locations and condition of over 40,000 historic homes in six parishes of post-Katrina New Orleans. The data for each home included precise geospatial coordinates, structural descriptions using a local dictionary of housing terms from the Louisiana State Historic Preservation Office, flood damage data, and photographs.

In some GIS survey situations it is hard to reach an object whose position is needed. A high-voltage transformer may be located behind a protective fence, for example, or the top of a pile of coal may be growing or unstable. In these and many other situations an operator may find the position of an inaccessible object by using a laser rangefinder to estimate the distance from a GIS handheld to the object. Given the location of the GIS handheld and the range and bearing to the inaccessible object, the object's location can be estimated.

A GIS handheld with a laser rangefinder and a camera is useful for obtaining digital images that are automatically tagged with position data for objects that the camera is aimed at. The camera may display cross-hairs in a video viewfinder mode to help an operator aim directly at an object such as a water pipe in a trench. For accurate results the camera and rangefinder must be aligned so that the cross-hairs in the camera image correspond to the point measured by the laser rangefinder. In some implementations the laser rangefinder, although itself operating with an infrared laser, includes a pre-aligned spotting laser operating at visible wavelengths. This is helpful both for human observers who can't see infrared light and repurposed consumer digital cameras that have infrared blocking filters. What are needed, therefore, are systems and methods to align a laser rangefinder (or its spotting laser) and a digital camera.

A GIS handheld provides just one example of the utility of finding a spot in a digital video image. A similar example is provided by a laser gun sighting system in which a digital camera acts as a target scope and a laser illuminates a target. In that case it is helpful to align the camera and laser to each other and to the barrel of the gun. Even more generally, many other situations require finding a spot in a video image. The spot may be illuminated by a laser or may itself be a light source such as a light-emitting diode (LED). Thus what are needed are systems and methods for video alignment with optical sources.

DETAILED DESCRIPTION

The video alignment systems and methods described below are presented in the context of a handheld GIS data collection device, but are generally applicable to many scenarios involving locating an illuminated spot in a video image.

Figure 1:
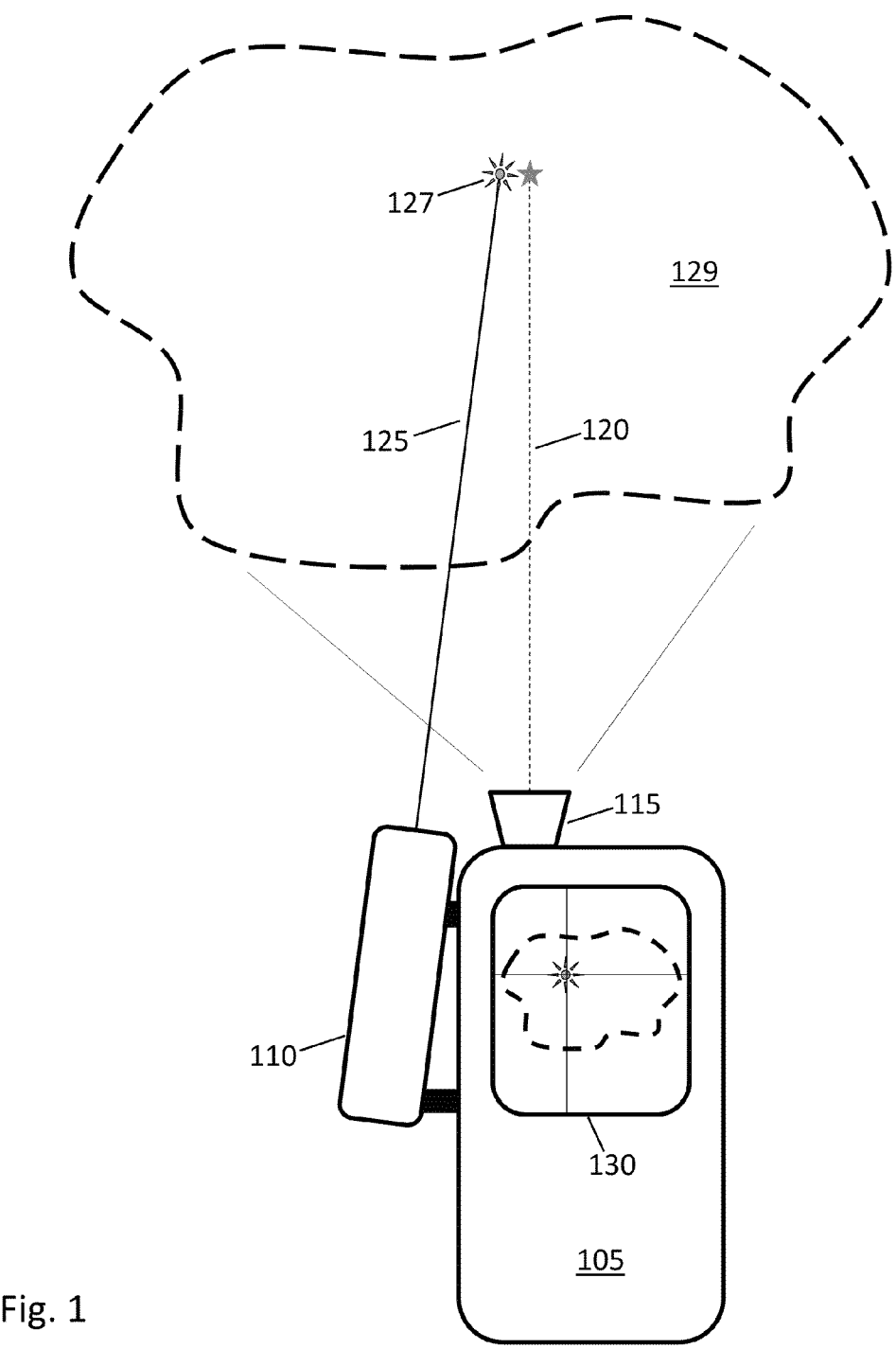
FIG. 1 illustrates a hand-held computer with an integrated high-accuracy GNSS receiver, a digital camera, and a detachable laser rangefinder.

FIG. 1 illustrates a hand-held computer 105 with an integrated high-accuracy GNSS receiver, a digital camera, and a detachable laser rangefinder 110. The computer may be configured as a GIS data collection tool that records user input, digital photographs, and positions estimated from GNSS and laser rangefinder data. Advanced units may offer centimeter level positioning accuracy and cellular radios for communication with databases maintained in the cloud, among other features.

Camera lens 115 defines a symmetry axis 120. Similarly, a laser beam emitted by laser rangefinder 110 defines an axis 125 along which the rangefinder estimates distance. (The beam creates a spot 127 in scene 129.) In an ideal device, the two axes would be coincident; i.e. they would lie upon each other. That way the range estimated by the rangefinder would be the distance to an object appearing in the center of the camera's field of view.

In practice, however, the two axes are generally neither coincident nor parallel. Typically, the rangefinder is offset a centimeter or so from the camera and does not share a common lens. Thus when the camera displays a video image (e.g. on display 130) as a viewfinder, the point in the image measured by the laser rangefinder may not be in the center.

It is helpful to display cross-hairs (e.g. 135 or other indicators) to show a user where in the image the laser rangefinder is pointing. Most digital cameras have infrared blocking filters that prevent direct detection of the infrared rangefinder laser beam, but are capable of seeing a visible spotting laser beam that is aligned to it. Because of eye safety concerns, however, the spotting laser beam is usually quite weak and can be hard to see outdoors in daytime.

If the spotting laser beam can be detected, cross-hair positions for various ranges can be stored in the computer's memory. If the distance being estimated by the rangefinder is much greater than the offset between the camera and laser axes (as is usually the case in practice), the position where the spotting laser beam appears, and where the cross-hairs should be drawn, changes slowly with distance.

Detecting a spot made by a spotting laser beam (or other light source, such as a light emitting diode) in a video image is made difficult by several problems that are listed along with solutions in Table 1:

TABLE 1

Problems and solutions associated with video alignment.

| Problem | Solution |
|---|---|
| Weak signals | PRN code correlation |
|  | Pixel neighborhood |
| Limited computer resources | Integer arithmetic |
| Unknown laser and camera clock phase | Track multiple phase shift candidates |
| Laser and camera clock drift | Term limit techniques |
| Irregular camera frame arrival times | PRN code correlation |
| Dropped frames | Discard extra frames to even bit count |
| Large amplitude false positive correlation peaks | Normalize correlation sum with voting system |
| Desired signal may cover more than one pixel | Exclusion zone technique |
| Consistent results required | Success criteria |

The first problem, weak signals, e.g. from a dim spotting laser beam in bright sunlight, is easy to understand. The second, limited computer resources, may be a factor for handheld devices that use low-power processors, especially when the processor is engaged in other activities such as mapping, GNSS signal processing, data communications, etc. The video alignment methods described below are designed to be implemented using integer arithmetic which runs efficiently and makes best use of limited computing power.

As described in more detail below, both the light signal source, e.g. a spotting laser or LED, and the detector, i.e. a video camera, have periodic temporal attributes. The light source may be modulated by a periodic signal characterized by frequency $f_S$. The video camera acquires video image data frame-by-frame with a frame repetition rate characterized by frequency $f_V$. Suppose, as an example, that $f_S$=5 Hz and $f_V$=30 Hz. In this case there are six camera frames per signal period. In an ideal case the first of the six frames would begin at the same time as a signal period. In the practical situation considered here, however, the relationship between the two starting times is unknown. "Unknown laser and camera clock phase" refers to this issue. It is a consequence of using a free-running camera that does not have sync input or electronic trigger capability.

Furthermore, the unknown phase changes over time ("laser and camera clock drift"). Phase drift can lead to significantly different phase relationships during measurements taken just tens of seconds apart. Worse, the video frame rate sometimes changes drastically which leads to irregular camera frame arrival times. This means that laser spot detection techniques that depend on constant sampling rates (i.e. constant video frame rates), such as conventional fast Fourier transforms, may be problematic. Finally, some video frames may be dropped altogether!

The handheld GIS data collection device application used here as an example also presents another issue: Users of handheld devices have unsteady aim. The scene appearing in a video viewfinder image is not constant. A worst-case scenario from a signal detection point of view occurs when the video camera is panned across a scene having periodic features that may be mistaken for periodic signal modulation. Unaddressed, this creates large false positive signals ("large amplitude false positive correlation peaks") that can obscure the actual location of a laser spot in a video image.

The remaining two problems mentioned in Table 1 ("Desired signal may cover more than one pixel" and "Consistent results required") are discussed along with their respective solutions below.

In video alignment systems described herein, an optical signal source, e.g. a rangefinder spotting laser, is modulated. A spot created by light from the laser striking an object appearing in a video image is similarly modulated. Here, the modulation signal is a pseudorandom noise (PRN) code such as 1 1 0 1 1 1 0 0 0 0 0 1 1 0 0 0 0 0 1 1 0 1 1 0 1 1 1 0 1 0. A "1" means the laser is on; a "0" means it is off. A PRN code has an equal number of 1's and 0's. In this example the code is 30 bits long and; after that the code repeats ad infinitum. For purposes of illustration, a two-bit code, 1 0, is used in the description of video alignment systems below.

Figure 2A:
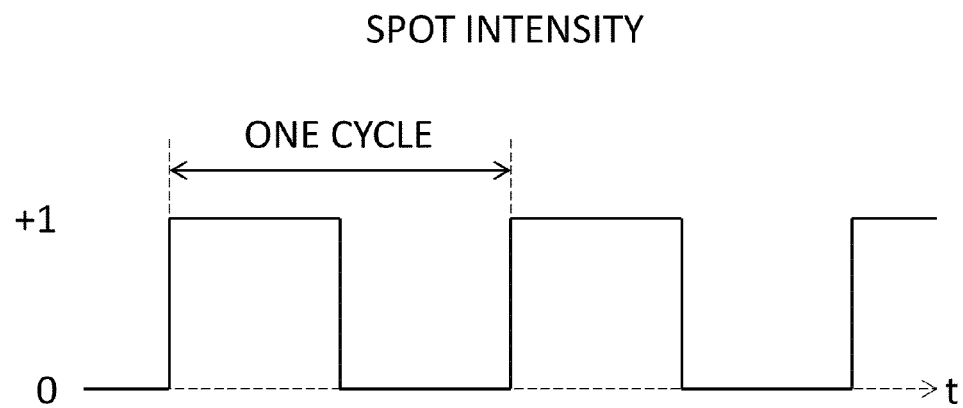
FIGS. 2A and 2B show laser spot intensity and correlator function, respectively, versus time.
Figure 2B:
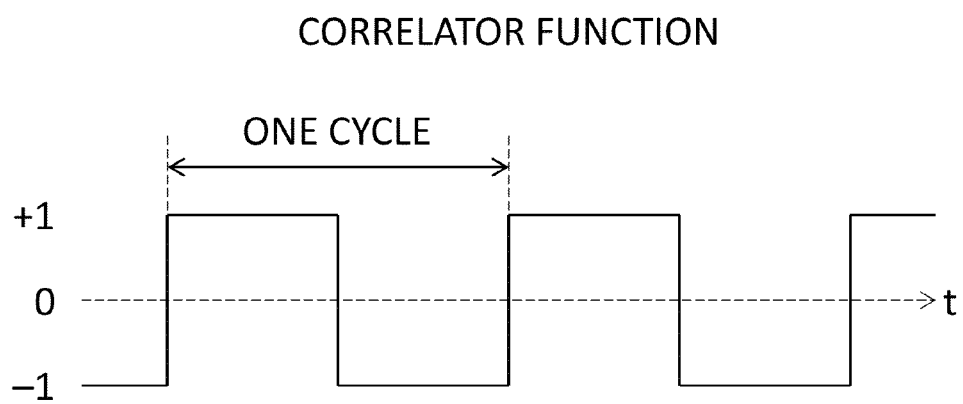

FIG. 2A shows laser spot intensity versus time for the two-bit code, 1 0. The code repeats after one cycle as shown in the figure. FIG. 2B shows the corresponding correlator function for the code in FIG. 2A. The correlator function is equal to 1 when the PRN code is 1 and it is equal to −1 when the PRN code is 0.

In the GIS data collection device of FIG. 1, handheld computer 105 generates a PRN code that modulates a spotting laser in laser rangefinder 110. An internal clock provides timing for the code bits. Although the computer also receives video data from a digital camera contained in the GIS device, the computer does not trigger the camera nor specify when video exposures occur.

Figure 3:
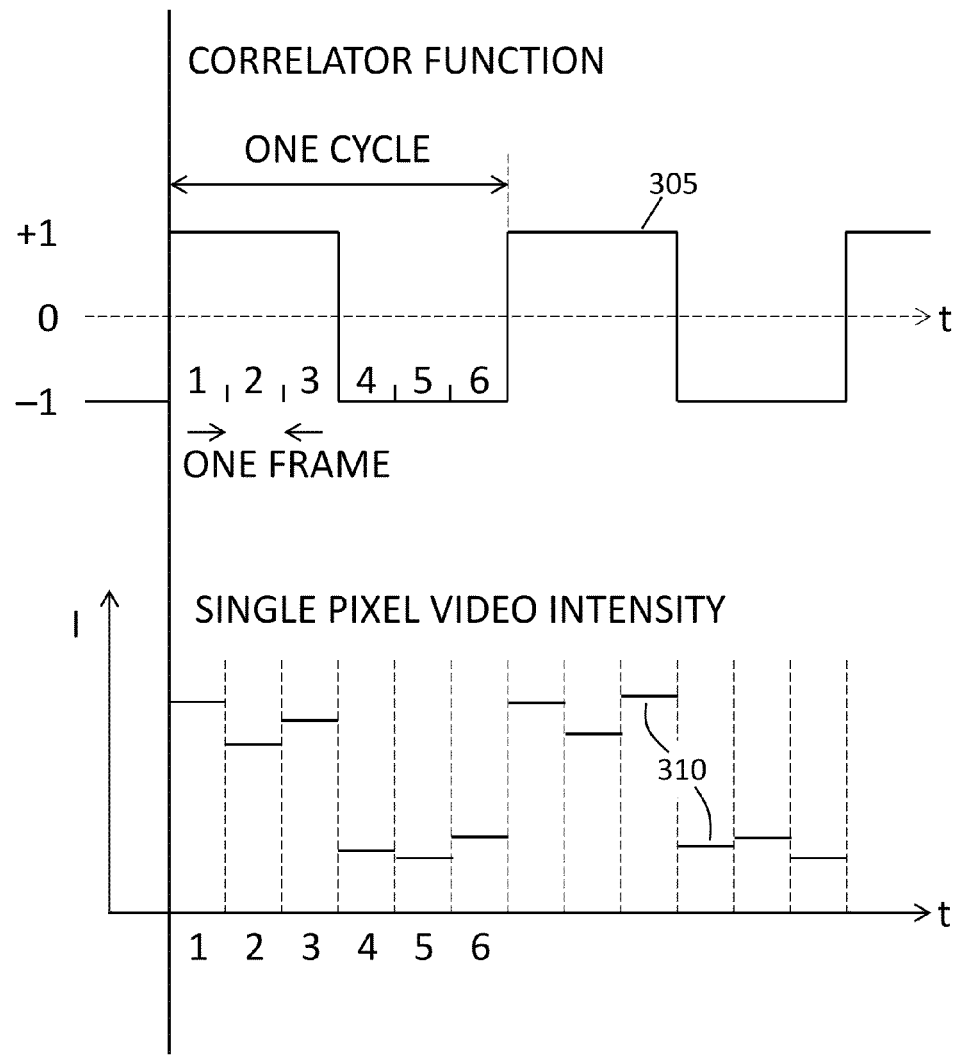
FIG. 3 illustrates an example of laser spot and video frame timing.

FIG. 3 illustrates an example of laser spot and video frame timing. In this example, the phase shift between the laser and camera is zero: a new video exposure starts at the same time as the laser intensity cycle and there is an even integer number of frames per cycle. Graph 305 shows a correlator function for a 1 0 code as in FIG. 2B. Graph 310 shows the light intensity received at a single pixel in a video camera. The intensity changes whenever a new video frame is received; thus graph 305 is composed of a series of horizontal bars. Vertical dashed lines mark the beginnings of new video frames. Numbers "1 2 3 4 5 6" in FIG. 3 label six video frames that occur during one cycle of the correlator function, or equivalently, during one laser spot intensity cycle. The single pixel intensity is greater when the laser is on than when it is off. Hence, correlation suggests that some of the light falling on the pixel whose intensity is graphed in FIG. 3 comes from the laser.

When the phase relationship between the correlator function and video frame timing is known and constant as in FIG. 3, correlation techniques may be used to detect modulated signals. More advanced methods are needed when the phase relationship between the laser spot and video frames is not known and possibly varying.

Figure 4:
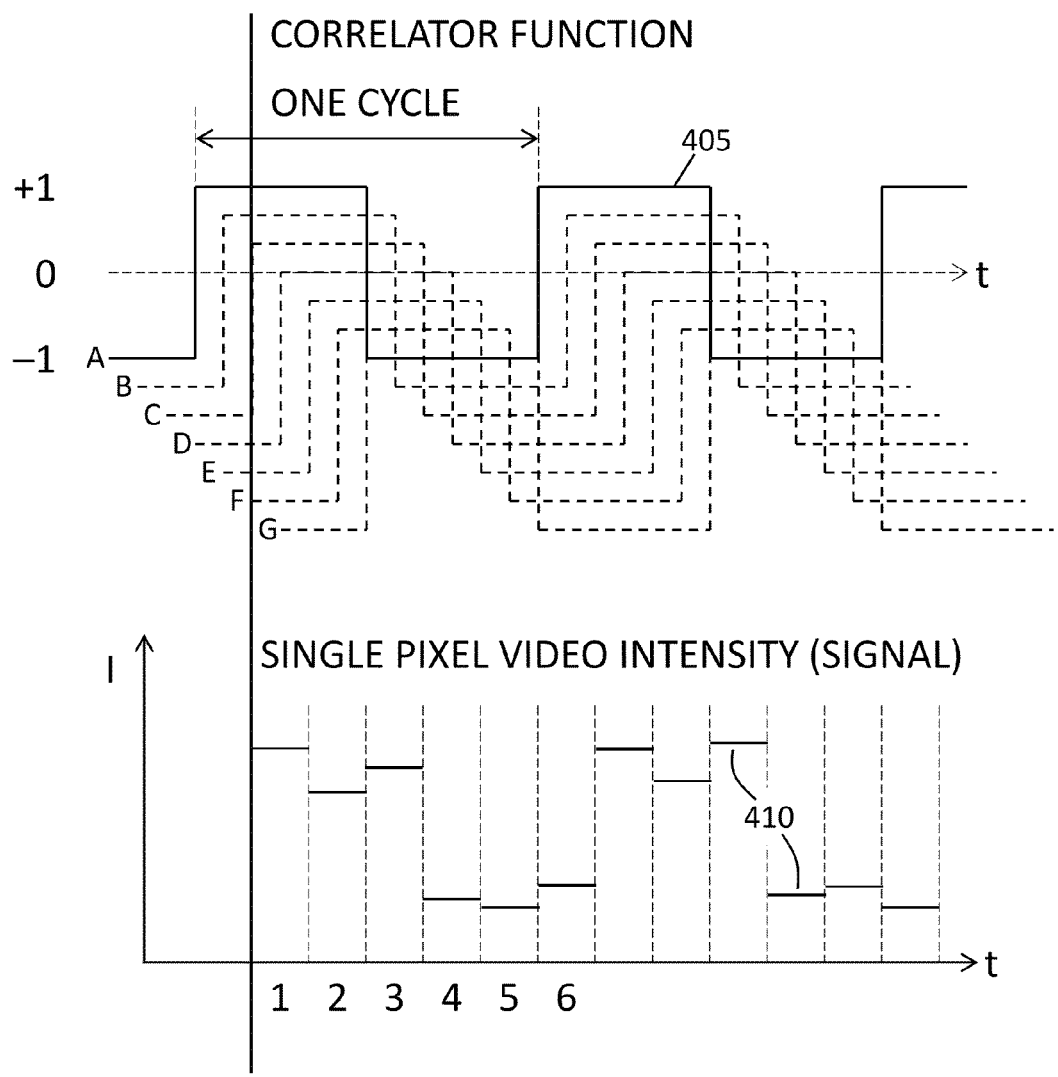
FIG. 4 illustrates laser spot and video frame timing with multiple correlator function phase shifts.

FIG. 4 illustrates laser spot and video frame timing with multiple correlator function phase shifts. FIG. 4 is similar to FIG. 3 in that graph 405 shows a correlator function for a 1 0 code and graph 410 shows the light intensity received at a single pixel in a video camera. In FIG. 4, however, the phase shift between the laser and camera is not zero: a new video exposure starts at an arbitrary time during the laser intensity cycle. As in FIG. 3, numbers "1 2 3 4 5 6" label six video frames, but these frames span parts of two laser cycles.

In FIG. 4, seven replicas of correlator function 405 are shown with dashed lines. These replicas are labeled "A B C D E F G" where "A" is just graph 405. Replicas "B" through "G" are phase shifted by successively greater amounts from "A". They are shown offset vertically only to aid understanding of the figure. Each replica is a function that varies between +1 and −1 just like graph 405. It is apparent that phase replica "C" is most closely aligned with single pixel video intensity signal 410. As described below, a video alignment method keeps track of several phase shift candidates during correlation as a way of dealing with unknown phase shifts.

Figure 5:
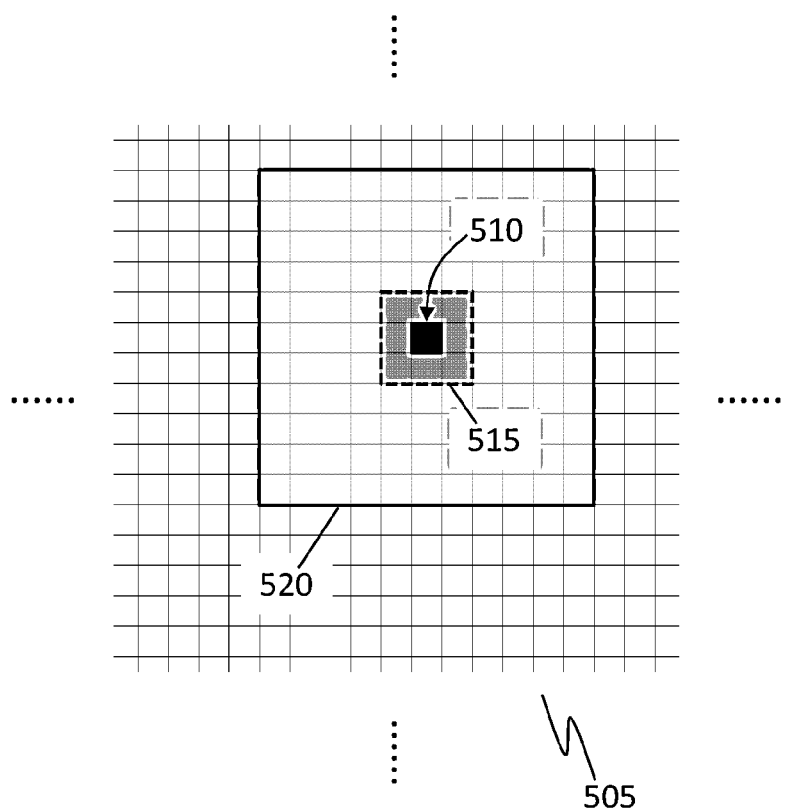
FIG. 5 provides examples of a pixel neighborhood and a pixel exclusion zone.

FIG. 5 provides examples of a pixel neighborhood and a pixel exclusion zone. Grid 505 represents pixels of a video camera, or equivalently, pixels in a video image. Target pixel 510 is colored black for identification. A pixel neighborhood is defined by a border 515 around pixels near the target pixel. In FIG. 5, the pixel neighborhood is a 3 by 3 set of pixels centered on and surrounding the target pixel. Pixel neighborhoods generally range in size from 1 by 1 to roughly 5 by 5. A 1 by 1 pixel neighborhood is just the target pixel itself.

An exclusion zone is defined by a border 520 around pixels near the target pixel. In FIG. 5, the exclusion zone is an 11 by 11 set of pixels centered on and surrounding the target pixel. An exclusion zone contains more pixels than a neighborhood. Exclusion zones generally range in size from roughly 5 by 5 to roughly 25 by 25 pixels. The utility of pixel neighborhoods and exclusion zones is explained below.

Figure 6:
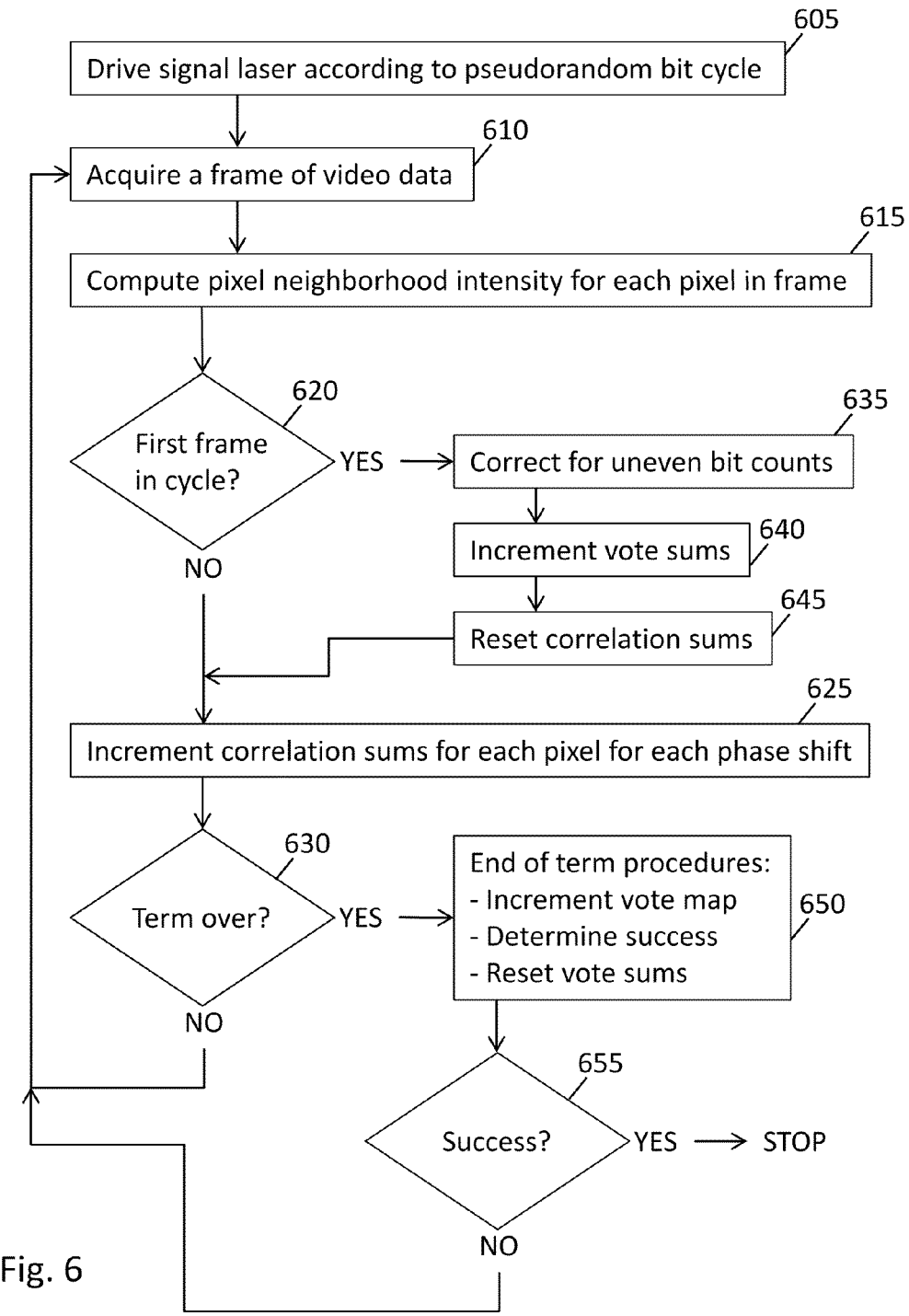
FIG. 6 is a flow chart for a video alignment method.

FIG. 6 is a flow chart for a video alignment method. The method represents a way to identify which pixel in a video image is closest to the location of a laser spot in the image. The method is carried out by a processor (e.g. in computer 105), a signal laser, a video camera and ancillary components.

In FIG. 6, step 605 is driving a signal laser according to a pseudorandom bit cycle. This means modulating a laser beam on and off according to the bits of a PRN code. The PRN code may have arbitrary length from a two-bit (1 0) code to codes containing hundreds of bits. Step 610 is acquiring a frame of video data from a video camera. A frame is a digital still image; a succession of frames makes up a video sequence.

Step 615 is computing pixel neighborhood intensity for each pixel in a frame. If the size of the neighborhood is 1 by 1 pixel, then the neighborhood intensity is just the pixel intensity. The neighborhood may be made larger to increase gain during weak signal conditions. Additional considerations include using intensity from only one video color channel, e.g. the red channel when detecting a red spot, or combining intensities from all color channels.

Decision 620 starts two branches in the flow chart. If the most recent frame received from the video camera is the first frame to occur during the current laser cycle, then the next step is 635. On the other hand if the most recent frame is not the first of the cycle, then the next step is 625. As an example, referring to FIG. 4, frame "1" is the second frame in the cycle of phase shift candidate "A".

Step 625 is incrementing correlation sums for each pixel for each phase shift. A correlation sum is formed from products of pixel intensities and correlator function values. For example: If a particular pixel's intensity is 92 (in arbitrary units) during a certain frame and the correlator function is +1, then the product is +92. If the same pixel's intensity is 23 during the next frame and the correlator function is −1, then the product is −23. After two frames the correlation sum for that pixel is (92)+(−23)=69. Correlation sums are incremented (i.e. added to) for each pixel when a new frame of video data is available.

Furthermore, correlation sums are incremented for each pixel for each of several phase shift candidates. If a video frame contains N pixels, and M phase shift candidates are tracked, then N×M correlation sums are incremented in step 625. Referring again to FIG. 4, each of phase shift replicas "A" through "G" may be a phase shift candidate. Thus, when video frame "1" data is available, a correlation sum for each pixel is incremented by pixel intensity multiplied by correlator function value. The correlator function corresponding to frame "1" is +1 for phase shifts "A", "B" and "C". It is −1 for phase shifts "D", "E", "F" and "G". (Here, by convention, the beginning of a frame is used to mark the frame time so the correlator function for phase shift "D" is −1. A different convention, e.g. using the frame end time, could be used instead as long as it is applied consistently.) The various phase shifts that are tracked are referred to as "phase shift candidates" since it is not known which one is most closely aligned with the actual arrival of video frame data.

Decision 630 starts two branches in the flow chart. If the term is over, then the next step is 650, end of term procedures. On the other hand, if the term is not over, then the next step is 610, acquire another frame of video data.

A term is a fixed number of pseudorandom code cycles. It may be as few as two cycles. There is no upper limit to the number of cycles in a term, but in many practical scenarios, there are less than about ten cycles in a term. As discussed below in connection with end-of-term procedures and FIG. 7, terms are part of a mechanism for dealing with changing phase shifts between the laser bit cycle and camera video frames. The length of a term for a given video alignment application is set to be less than the length of time over which laser cycle and video frame relative phase changes significantly.

Success in finding the pixel closest to a laser spot in an image is declared in decision 655. Successful location of that pixel ends the video alignment method. Otherwise, another frame of video data is acquired in step 610.

Returning now to decision 620, if the most recent frame received from the video camera is the first frame to occur during the current laser cycle, then the next step is 635 correcting for uneven bit counts in the previous cycle. Step 640 is incrementing vote sums and step 645 is resetting correlation sums.

The pseudorandom code that is used to modulate the laser is composed of 1's and 0's, an equal number of which occur in each code cycle. Dropped frames, however, may lead to unequal amounts of laser on and laser off time being sampled by video frames. Frames may be dropped if video processing is too low a microprocessor priority or for other reasons. In step 635, extra frames are discarded to make the number of frames occurring during 1's equal to the number occurring during 0's.

The next step, 640, is incrementing vote sums. A vote is either +1 or −1. A +1 vote for a pixel occurs when the correlation sum over a bit cycle for that pixel is positive. A −1 vote occurs when the correlation sum over a bit cycle is negative. Votes are tracked for each pixel and phase shift. Thus, N×M vote totals are tracked. To recap: Correlation sums are incremented frame by frame; vote sums are incremented cycle by cycle.

Votes normalize positive and negative correlation sums, however great their magnitude, to +1 or −1, respectively. Votes help solve the problem of large-amplitude, false-positive correlation peaks. False positive correlations can occur when pixel intensities in a video image accidentally vary in sync with a PRN code. For example, if a video camera pans across a checkerboard pattern, the intensity of any given pixel will vary in an approximately 1 0 pattern. This may lead to false positive correlation signals if the PRN code in use is also 1 0. Longer PRN codes give better rejection of false correlation matches, but fewer cycles are completed for analysis in a given amount of time.

False positive signals may have amplitudes that are much larger than the true correlation peak associated with pixels corresponding to the location of a modulated laser spot. Keeping track of normalized votes rather than raw correlation sums removes the effect of occasional large false-positive correlations.

Step 645 is resetting correlation sums from the previous PRN code cycle to zero in preparation for the next cycle.

The effect of steps 620-645 is that vote sums for N×M pixel/phase-shift combinations are tracked during a term. When a term ends, end-of-term procedures such as incrementing a vote map, determining alignment success, and resetting vote sums to zero in preparation for the next term (if there is one), are performed. End of term procedures are listed in greater detail in the flow chart of FIG. 7.

End of term procedures are designed to identify which pixel in a digital image is closest to the center of a laser spot appearing in the image.

Figure 7:
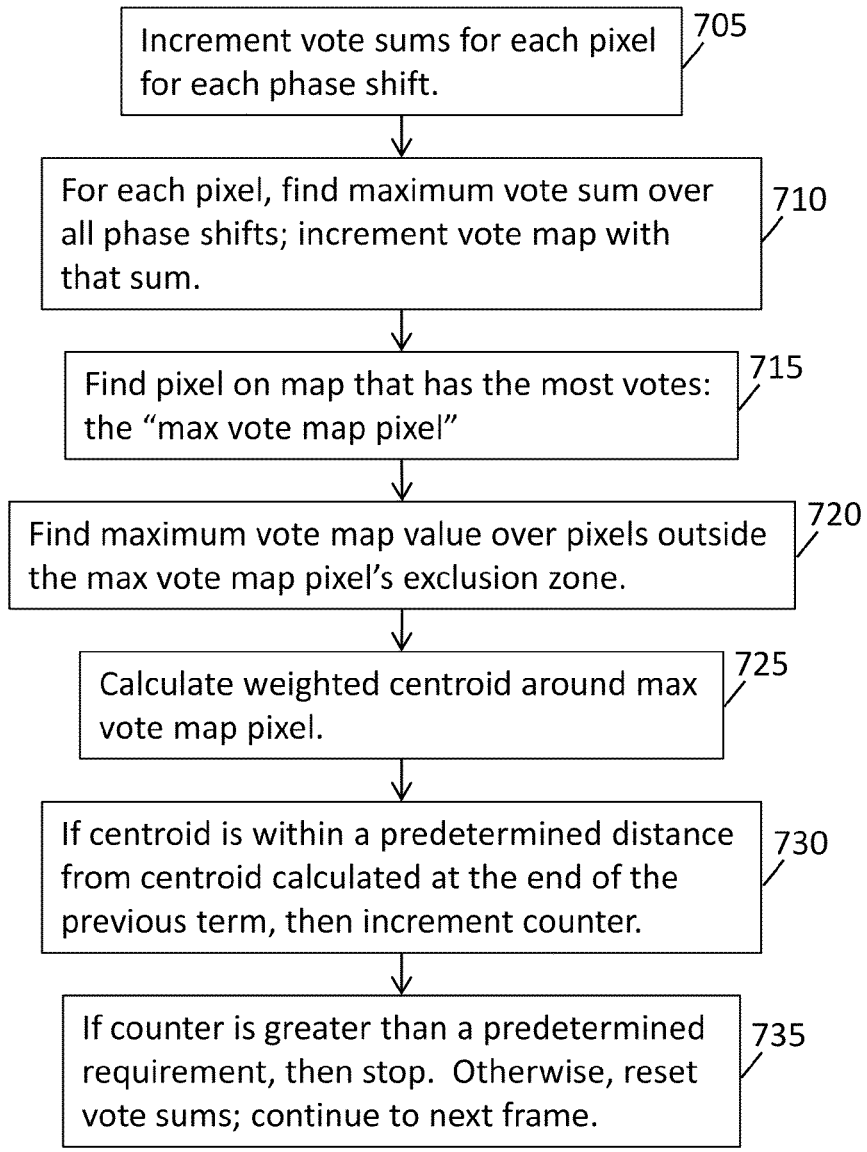
FIG. 7 is a flow chart for procedures in a video alignment method.

In FIG. 7, step 705 is incrementing vote sums for each pixel for each phase shift. This step has the same effect as step 640. Step 710 is, for each pixel, finding the maximum vote sum over all phase shifts, and incrementing a vote map with that sum. Vote sums are tracked for M different phase shifts for each pixel, and one of the M phase shifts has the largest vote sum. For each pixel, this maximum vote sum is added to the vote map. The phase shift that produces the maximum vote sum need not be the same for each pixel.

A vote map is a two-dimensional array of maximum vote sums. The vote map has the same dimensions (in pixels) as images obtained from the video camera. Step 715 is finding the pixel on the map that has the most votes. This is the max-vote map-pixel.

Step 720 is finding the maximum vote map value among pixels that are outside the max-vote map-pixel's exclusion zone. An exclusion zone around the max-vote map-pixel helps account for cases in which the laser spot (whose pixel location is desired) covers more than one pixel. This happens when the spot is large and/or near the camera. The exclusion zone is designed to be larger than the expected spot size.

Spot size depends on distance away from the camera. The distance is immediately available in a laser rangefinder application so the exclusion zone may be set depending on range data. When distance information is not available, the size of the exclusion zone may be set to cover a worst-case scenario.

The maximum vote map value among pixels that are outside the max-vote map-pixel's exclusion zone represents a measurement of background pixel intensity noise level in a video alignment system. Step 725 is calculating a weighted centroid around the max-vote map-pixel. This centroid is weighted by vote map values but excludes any pixel having a vote map value less than the maximum vote map value among pixels outside the exclusion zone. Thus all pixels outside the exclusion zone are ignored for purposes of computing the weighted centroid. Any pixels inside the exclusion zone, but having vote map values less than the maximum vote map value among pixels outside the exclusion zone, are also ignored.

Step 730 is incrementing a counter if the centroid computed in step 725 is within a predetermined distance from a centroid computed at the end of the previous term. The predetermined distance is a performance criterion for the video alignment system. It may be as small as a fraction of a pixel or as large as several pixels.

The outcome of step 735 depends on the value of the counter. If it is greater than a predetermined requirement, then the location of the laser spot in the video image is considered to have been found and the video alignment method stops. Cross-hairs, e.g. 135, may be drawn on a video screen to indicate the estimated spot location. Otherwise, all vote sums are reset to zero and another frame of video data is acquired in step 610 of FIG. 6.

The requirement that the counter must satisfy to end the video alignment method is another performance criterion for the system as a whole. It may be any integer, but is typically less than ten.

Figure 8:
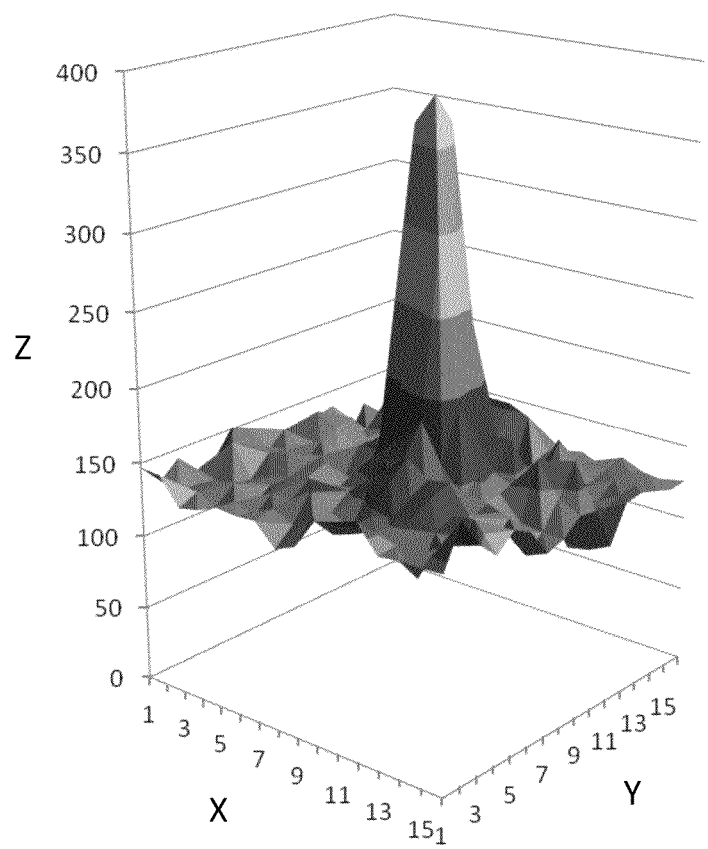
FIG. 8 is an example of a pixel vote map.

FIG. 8 is an example of a pixel vote map. In FIG. 8, vote map values are plotted on the Z axis as a function of pixel X and Y coordinate for pixels within about ±8 pixels in either dimension from the max-vote map-pixel. In the figure, the max vote map pixel is at (X, Y) coordinates (9, 9) and has roughly 350 votes.

The systems and methods described above are applicable to many situations in which the pixel location of a spot in a video image is desired. The spot is illuminated by a modulated light source such as a laser or light emitting diode. Modulation of the light source follows a pseudorandom noise code and is controlled by a processor that interprets video image data.

The systems methods are designed to work in spite of practical difficulties such as a free-running video camera that does not accept sync or trigger inputs and therefore may be out of phase with the light source modulation by an unknown and variable amount. The voting techniques described above solve the problem of potentially large false-positive correlation signals.

As described so far, the video alignment systems and methods are limited to cases in which a light source illuminates one particular spot in an image even when the camera moves or the background scene changes. This situation is most often obtained when the light source and the camera are mechanically connected, as in the case of a laser rangefinder attached to a handheld GIS device.

The systems and methods may be extended to a more general case in which the illuminated spot may move with respect to the camera's pixel coordinate system. In this case image- or feature-matching techniques may be used to align the contents of each video frame before applying the correlation techniques described above.

The above description of the disclosed embodiments is provided to enable any person skilled in the art to make or use the invention. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A video alignment system comprising:
   a light source for illuminating a spot in a scene, the light source being modulated according to a pseudorandom noise code having a corresponding correlator function;
   a video camera that captures digital images of the scene; and,
   a processor that: receives digital image data from the video camera, correlates image pixel intensities with the correlator function, normalizes correlation results with a voting system, and identifies a pixel in the digital images as a location of the spot on the basis of pixel vote totals.

2. The system of claim 1, the processor correlating image pixel intensities with multiple correlator function phase shift candidates.

3. The system of claim 1, the pseudorandom noise code being 1 0.

4. The system of claim 1, the camera being free-running without synchronization input.

5. The system of claim 1, the light source, video camera and processor being components of a hand-held geographic information system data collection device.

6. The system of claim 5, further comprising a laser rangefinder that provides to the processor estimates of a distance from the camera to the spot.

7. The system of claim 1, the processor further indicating the location of the spot on a digital image display.

8. The system of claim 7, the indicating being effected by depicting digital cross-hairs on the display.

9. A video alignment method comprising:
illuminating a spot in a scene with a light source, the light source being modulated according to a pseudorandom noise code having a corresponding correlator function;
capturing digital images of the scene with a video camera;
a processor receiving digital image data from the video camera; and,
the processor: tracking correlation sums that are sums of products of video pixel intensities and correlator function values, normalizing the correlation sums to +1 vote for positive sums and −1 vote for negative sums, and identifying a pixel in the digital images as a location of the spot on the basis of pixel vote totals.

10. The method of claim 9, the processor identifying the pixel location of the spot after accumulating votes for a predetermined number of cycles of the pseudorandom code.

11. The method of claim 9, the processor identifying the pixel location of the spot by finding a centroid of pixels weighted by pixel vote totals, ignoring pixels outside a pixel exclusion zone around a maximum vote pixel.

12. The method of claim 11, further comprising estimating a distance from the camera to the spot with a laser rangefinder and the processor computing a size of the exclusion zone based on the estimated distance.

13. The method of claim 12, the light source, video camera, laser rangefinder and processor being components of a handheld geographic information system data collection device.

14. The method of claim 13 further comprising depicting digital cross-hairs on a display of the data collection device to indicate the pixel location of the spot.

15. The method of claim 9, the processor tracking pixel correlation sums for multiple correlator function phase shift candidates.

16. The method of claim 9, the processor tracking pixel correlation sums for each pixel in a digital image.

17. The method of claim 9, the pseudorandom noise code being 1 0.

18. The method of claim 9, the camera being free-running without synchronization input.

19. The method of claim 9, the processor using only integer arithmetic.

20. The method of claim 9, the processor performing feature-matching to align video images before estimating the location of the spot in the images.

* * * * *